(12) United States Patent
Ito

(10) Patent No.: US 6,731,414 B1
(45) Date of Patent: May 4, 2004

(54) IMAGE PROCESSING APPARATUS

(75) Inventor: Akira Ito, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/516,064

(22) Filed: Mar. 1, 2000

(30) Foreign Application Priority Data

Mar. 2, 1999 (JP) ............................................. 11-054107

(51) Int. Cl.[7] .................................................. G06K 9/00
(52) U.S. Cl. ........................ 358/537; 358/540; 358/528; 358/426.01; 382/308; 382/298; 382/299
(58) Field of Search ................................. 358/540, 537, 358/528, 426.01; 382/308, 298, 299; H04N 1/48, 1/50, 1/58

(56) References Cited

U.S. PATENT DOCUMENTS

| | | | | |
|---|---|---|---|---|
| 5,270,808 A | * | 12/1993 | Tanioka | ........................ 358/527 |
| 5,781,308 A | * | 7/1998 | Fujii et al. | ................... 358/451 |
| 5,991,464 A | * | 11/1999 | Hsu et al. | .................... 382/300 |
| 2003/0227638 A1 | * | 12/2003 | Draaisma | ..................... 358/1.9 |

* cited by examiner

*Primary Examiner*—Edward Coles
*Assistant Examiner*—Alan Rahimi
(74) *Attorney, Agent, or Firm*—RatnerPrestia

(57) ABSTRACT

For preventing the occurrence of disjunction among a plurality of images in the magnification index in the main scanning direction, image data delivered from an external device through an input image data connector are converted by a P/S converter into serial data from parallel data, and then stored into a memory by a write controller. When the image data are cached, a read controller starts reading the image data. At the same time, a computation means starts counting time based on information set at a setting means by an external central processing unit. As soon as it reaches the initial insert interval, the read controller suspends reading of image data out of the memory to insert virtual data pixel. In the same procedure, the read controller inserts virtual data pixel at each of the insert intervals counted by the computation means. Image data that have undergone the above processing are delayed by a position correction means to have the plurality of image data aligned to a right positioning, and then transmitted through an output image data connector to an external image generator for printing.

9 Claims, 14 Drawing Sheets

IMAGE PROCESSING APPARATUS

TECHINCAL FIELD

The present invention relates to an image processing apparatus for use as a computer peripheral; more specifically, an image processing apparatus capable of performing a high speed processing using a laser beam.

BACKGROUND ART

Laser beam printers and the like image processing apparatus are now requested to be capable of printing large capacity image data provided by a computer with superior picture quality at a high speed. The mainstream technology used among such image processing apparatus is overlaying of image data delivered in pluralities of colors into a full-color picture.

In a conventional image processing apparatus, however, there arises during overlaying of a pluralities of image data a disjunction among respective image data, due to various reasons, in the magnification index along main scanning direction (main scanning magnification index). For example, when generating a color image by exposing image data of four colors, cyan (C), magenta (M), yellow (Y) and black (K), on a printing object one after another using a laser beam, etc., each of the laser beams for respective colors takes a different light path of its own en route to a photosensitive body. There is a subtle difference in the characteristics of the lenses for respective colors among each other, which difference results in a subtle dislocation among the colors when an image is generated on a printing object. In a practical fixed picture, such dislocation reveals itself as a chromaticity difference, or a roughness in the contour or on the image surface. If, in a conventional processing apparatus, an image is requested to be generated with a precise location alignment, all of the mechanical systems and the optical systems concerned are requested to be provided with a very high mechanical precision level. This leads to a high cost of the processing apparatus.

The present invention aims to offer an image processing apparatus, with which the occurrence of disjunction among the pluralities of image data in the main scanning magnification index is prevented at an inexpensive cost.

SUMMARY OF THE INVENTION

In printing a plurality of image data, for example, C, M, Y and K data overlaid together, difference in the main scanning magnification index among each other, or difference in the pixel counts along the main scanning direction may result in a displacement of colors among each other. An image processing apparatus in accordance with the present invention aims to prevent occurrence of the displacement during overlaying by making each main scanning magnification index identical to each other; namely, with one image data having the largest pixel counts per line and does not need to add any further pixel, or having a high main scanning magnification index, as reference, virtual data pixels are inserted into other image data to make their main scanning magnification indices even.

An image processing apparatus of the present invention comprises an input image data connection means for connecting with an external device, a parallel/serial converter for converting the parallel/serial conversion on input image data, a memory for storing the converted image data, a write control means for controlling writing of image data into the memory device, a read control means for controlling reading of image data out of the memory device, a setting means for storing control information specified by an external central processing unit, a computation means for computing, in accordance with setting information of the setting means, a timing for inserting pixel data into the image data to form a certain specific pixel unit, a position correction means for adjusting a timing of outputting the image data, and an output image data connection means for transmitting the image data after having been inserted with the pixel data to an external device.

In an image processing apparatus of the present invention, image data are stored into memory device under the control of the write control means, while the read control means independently reads image data out of memory device. Data pixel is inserted into the image data at every specific timing computed by the computation means. In this way, a disjunction in the main scanning magnification index among a plurality of image data is prevented at an inexpensive cost, yet with a high precision level.

Another image processing apparatus in accordance with the present invention further comprises diffusion means for calculating a diffusion quantity based on information set at the setting means, and diffusion quantity writing means for writing a diffusion quantity calculated by the diffusion means into the computation means, and controls the timing for reading image data out of the memory device and inserting pixel data into the image data.

Still another image processing apparatus of the present invention further comprises diffusion frequency generating means for generating a diffusion frequency that is controllable by an external central processing unit. The diffusion frequency generation means generates an irregular timing information, and controls the timing for reading image data out of the memory device and inserting pixel data into the image data.

DISCRIPTION OF THE PREFERRED EMBODIMENTS

Figure 1:
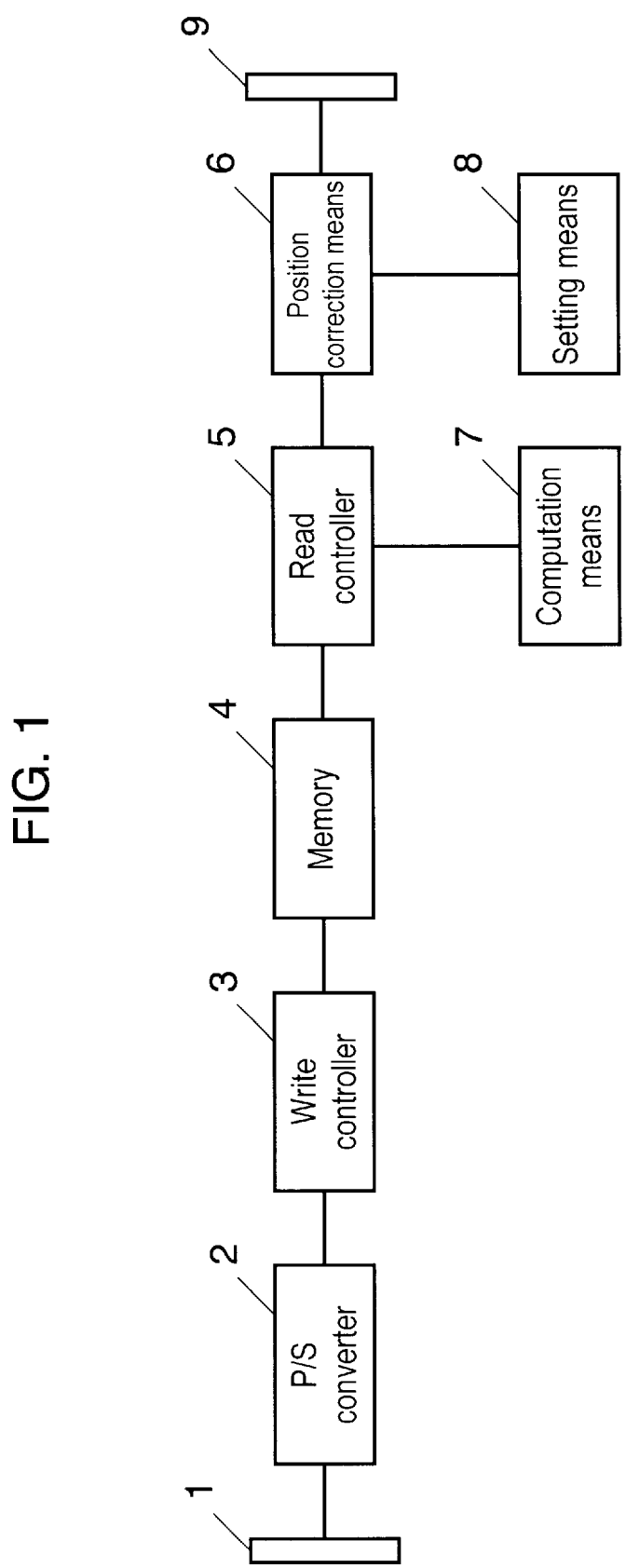
FIG. 1 is a block diagram showing a device structure of an image processing apparatus in a first and a second embodiment of the present invention.

Preferred embodiments of the present invention are described in the following with reference to FIGS. 1 through 14. In the drawings, similar items are represented with the same symbols, and descriptions of which are not repeated.

Embodiment 1

An image processing apparatus in accordance with a first exemplary embodiment of the present invention comprises, as shown in FIG. 1, input image data connection means 1 for connecting with an external device, a parallel/serial converter (P/S converter) 2 for conducting the parallel/serial conversion on image data, a write controller 3 for controlling writing of image data, a memory 4 for storing image data under the control of a write controller 3, a read controller 5 for reading image data out of the memory 4, a setting means 8 for storing control information specified by an external central processing unit (CPU), a computation means 7 for computing a timing for inserting pixel data into image data with a certain specific small unit of pixel based on the setting information at the setting means 8, a position correction means 6 for adjusting a timing for outputting image data, and output image data connection means 9 for transmitting image data after having undergone the image processing to an external device.

Figure 2:
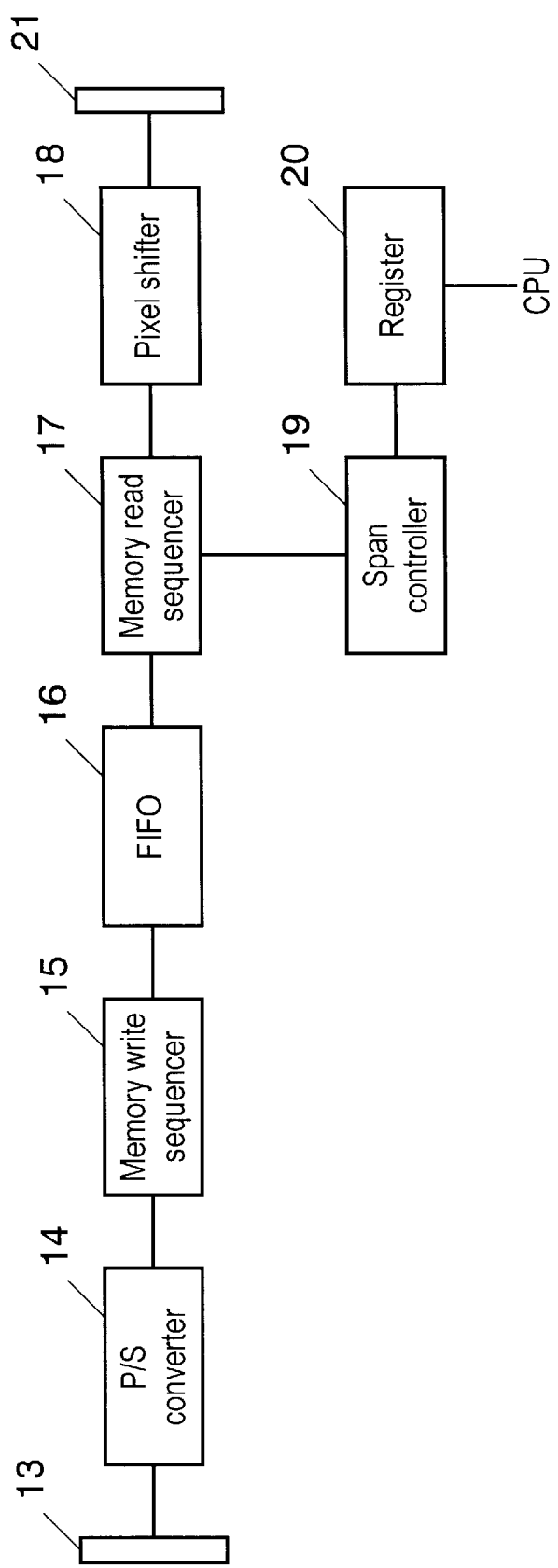
FIG. 2 Block is a block diagram showing a circuit structure of an image processing apparatus in a first and a second embodiment of the present invention.

The blocks in FIG. 2 correspond to the FIG. 1 counterparts.

A video input data connector 13 is for the image input data connection means 1 of FIG. 1. The video input data connector 13, which is present between the present image processing apparatus and an external device, is connected to a control bus for specifying a printing region and to a data bus for exchanging image data with an external device.

A P/S converter 14 is for the P/S converter 2 of FIG. 1. The P/S converter 14 converts the 8-bit parallel image data delivered through the video input data connector 13 into 1-bit serial image data. The 8-bit parallel image data may be converted into 2-bit image data, or other data having other bit-width, instead of the 1-bit serial image data.

A memory write sequencer 15 is for the write controller 3 of FIG. 1. The memory write sequencer 15 stores the serial image data converted at the P/S converter 14 into a first-in-first-out memory (FIFO) 16 real time. The FIFO 16 is for the memory 4 of FIG. 1.

A memory read sequencer 17 is for the read controller 5 of FIG. 1. The memory read sequencer 17 reads out image data stored in the FIFO 16 real time.

A register 20 is for the setting means 8 of FIG. 1. The register 20 is connected with an external CPU, and stores control information specified by the CPU.

A span controller 19 is for the computation means 7 of FIG. 1. The span controller 19 reads image data out of the FIFO 16 and performs computation for an additional data processing based on the control information stored in the register 20. The span controller 19 is provided with a counter CNT1 for determining an insert interval for a data insertion processing.

A pixel shifter 18 is for the position correction means 6 of FIG. 1. The pixel shifter 18 adjusts an output timing of the image data read out of the FIFO 16.

A video output connector 21 is for the output image data connection means 9 of FIG. 1. The video output connector 21 transmits the image data after having undergone the image processing to an external device. The video output connector 21 is connected to an external image generator, for example, a laser scanning unit (LSU), an LED head or the like. The image data after having undergone the data processing are transmitted via the video output connector 21 to an external image generator for printing.

An image processing apparatus in the present embodiment consists of a plurality of circuits of FIG. 2 provided for respective colors. It is capable of processing a plurality of image data, e. g. C.M.Y.K, independently to each other.

Figure 3:
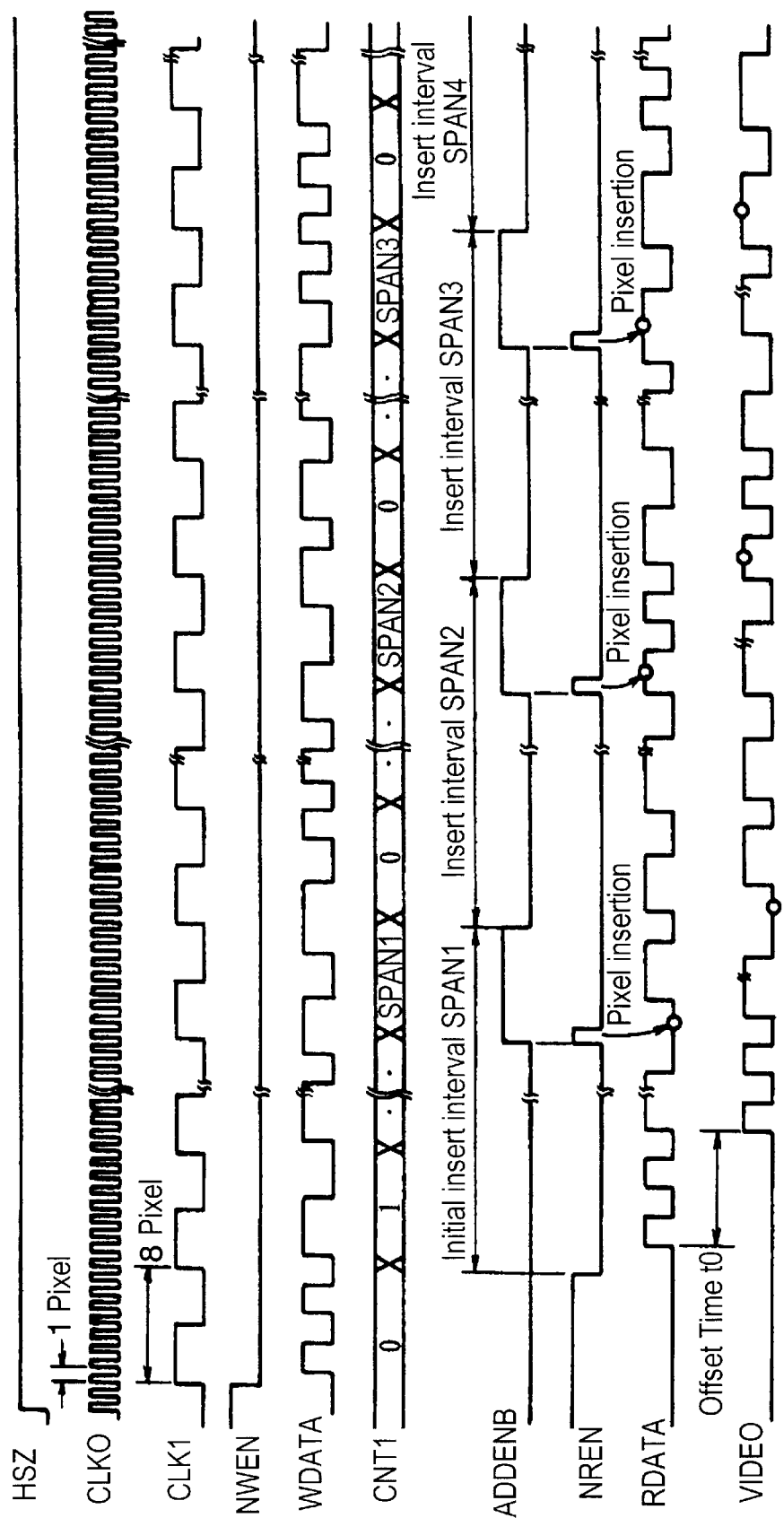
FIG. 3 is a timing chart of an image processing apparatus in a first and a third embodiment.

Function and operation of the above-configured image processing apparatus is described next referring to FIG. 3. "HSZ" in FIG. 3 represents a status signal that indicates effective region of image data.

An external device starts delivering image data in synchronization with the HSZ signal to the P/S converter 2 (P/S converter 14) through the input image data connection means 1 (video input connector 13). "CLK0" and "CLK1" are clocks generated by an external oscillator (not shown); CLK0 is a 1-pixel basic clock generated at an equal interval with every one pixel unit, CLK1 is an 8-pixel clock generated by dividing the CLK0 at an equal interval with eight pixel unit.

The P/S converter 2 (P/S converter 14) conducts the serial conversion on the delivered image data at the rising edge of CLK0 and sends them to the write controller 3.

The write controller 3 (memory write sequencer 15) turns the write control signal NWEN inable when the HSZ signal becomes effective, and starts storing the serial image data WDATA into the memory 4 (FIFO 16).

When the write control signal NWEN is turned inable, the memory (FIFO 16) stores the serial image data WDATA sequentially one after the other into memory cell at the rising edge of CLK0.

When the image data WDATA are cached in the memory 4 (FIFO 16), the read controller 5 (memory read sequencer 17) turns the read control signal NREN inable, and starts reading image data RDATA.

When the read control signal NREN is turned inable, the read controller 5 (memory read sequencer 17) outputs image data RDATA sequentially one after the other from the memory cell of memory 4 (FIFO 16) at the rising edge of CLK0. At the same time, the computation means 7 (span controller 19) turns counter CNT1 inable, and starts counting time with the CLK1 as the reference. As soon as it reaches an initial insert interval SPAN1, a pixel insertion flag signal ADDENB is output, and the CNT1 is initialized to resume the counting.

When the pixel insertion flag signal ADDENB is turned inable, the read controller 5 (memory read sequencer 17)

disables the read control signal NREN at the rising edge of CLK0, suspends the reading of image data RDATA out of memory 4 (FIFO 16), and adds virtual data pixel. The adding of data pixel is performed by inserting an appropriate pixel data relative to the value of neighboring pixels.

The pixel value to be inserted may be determined by, for example, taking the same pixel value as that of a pixel immediately before the inserting pixel, or a pixel immediately after the inserting pixel. Another exemplary method for determining the pixel value is using a table that provides relationships between the values of inserting pixel and pixels of immediate before and immediate after the inserting pixel. Still another exemplary method is using a table that provides relationships between a combination of pixels locating within a range covering the n-th pixel before the inserting pixel through the m-th pixel after the inserting pixel and the inserting pixel. The memory read sequencer 17 conducts insertion of n pixels in the same manner as described above with the insert intervals SPAN2, SPAN3, SPAN4, . . . , SPANn.

Each of the insert intervals SPAN2, . . . , SPANn is identical to each other, and values for each of the insert intervals SPAN2, . . . , SPANn and insert interval s are set in advance at the setting means 8 (register 20) by a CPU. The values are determined based on difference in the main scanning magnification index among each of the image data that have already been measured in advance. The measurement may be conducted by, for example, reading test images generated on a printing medium using a couple of light-emitting device and photo-detector.

For increasing the main scanning magnification index, the pixel counts n to be inserted may be increased. For this purpose, n pieces of reference register is provided. The SPAN1 is shorter than other insert intervals SPAN2–SPANn by the CNT count 1. This is because the computation means 7 (span controller 19) uses a value 0 for the initial value of counter CNT1. The insert intervals SPAN1–SPANn can be made equal by setting the initial value of counter CNT1 at −1.

The processed image data RDATA are delayed by the position correction means 6 (pixel shifter 18) for an offset time t0 at the rising edge of CLK0, and then transmitted as video signal VIDEO to an image generator via the output image data connection means 9 (video output connector 21) for printing.

One objective of providing the offset time t0 is for fine adjusting the left margin (LM), or aligning the right ends. Another objective is to match the phase among the respective colors. Namely, in an image processing in the present embodiment image signals are once stored in the FIFO, which results in a delay by several clocks with the post processing image data. If in a case where a certain color requires that the inserting pixel is to be determined based on a comparison with neighboring pixels locating in a range that is broader than that for the other colors, the number of pixels to be stored in FIFO increases; which brings about a certain time difference among the two items. The phase matching can be made by delaying other colors at an optional clock edge.

The status transition in the above-configured image processing apparatus is described with reference to FIG. 4.

Figure 4:
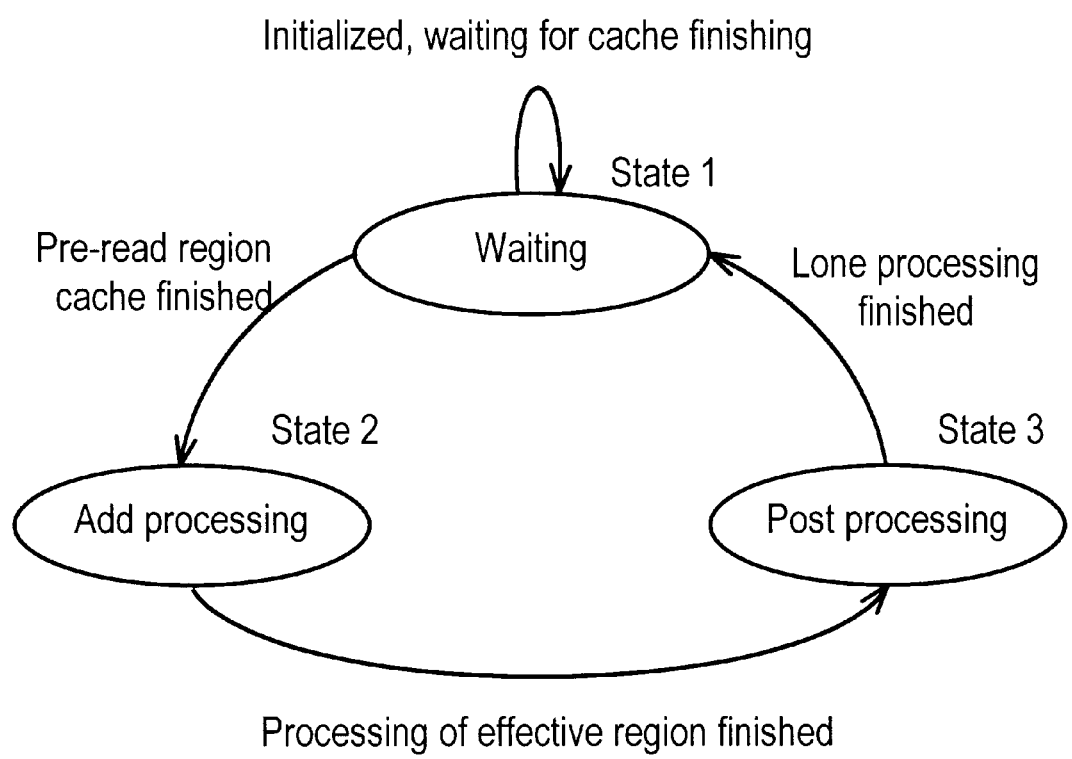
FIG. 4 is a status transition chart of an image processing apparatus in a first through a sixth embodiments.

The status transition shown in FIG. 4 is controlled by the read controller 5 (memory read sequencer 17). In order to make the description simple, FIG. 4 illustrates only one status transition controlled by the read controller 5 (memory read sequencer 17), among a number of other control means.

As shown in FIG. 4, the present image processing apparatus handles a plurality of image data; hence, there are a plurality of controls on the status transitions. Each of the transitions can take place totally independent to each other.

State 1 represents waiting. The present image processing apparatus remains in the waiting state during a period after it is initialized until the HSZ signal stays ineffective, and a period, even after the HSZ signal turned effective, until caching the data into FIFO 16 is finished. As soon as the HSZ signal turns effective and the write controller 3 (memory write sequencer 15) finishes cashing of the data into memory 4 (FIFO 16), it makes a transition to a next state 2.

The state 2 represents add processing. The read controller 5 (memory read sequencer 17) turns the read control signal NREN inable, and starts reading image data RDATA. Every time when the ADDENB is turned inable, the read controller 5 disables the read control signal NREN, suspends reading of image data RDATA out of the memory 4 (FIFO 16), and inserts virtual data pixel into the image data. As soon as the HSZ signal becomes ineffective, it makes a transition to a next state 3.

The state 3 represents the post processing. Here, the HSZ signal is expanded for a time corresponding to the inserting pixel counts n set in advance at the setting means 8 (register 20) by a CPU, and the same processing as in state 2 follows. As soon as all the processing is finished, it makes a transition to the initial state 1.

Figure 5:
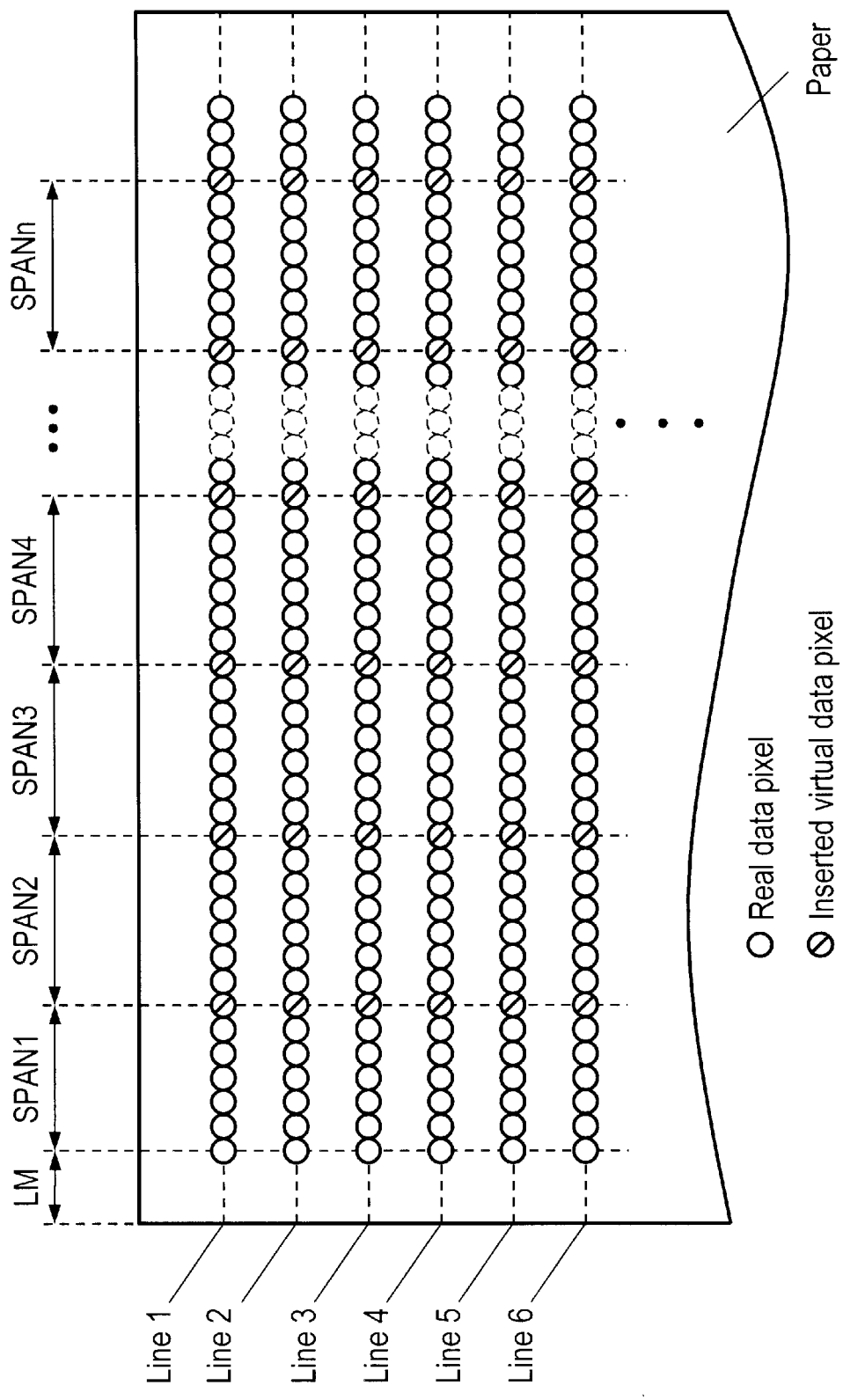
FIG. 5 is an example of print image by an image processing apparatus in a first and a second embodiment.

Next, a practical exemplary printing by an image processing apparatus in the present embodiment is described with reference to FIG. 5. In FIG. 5, the white circles represent real data pixels, while the circles having oblique line represent inserted virtual data pixels.

External image generators are normally provided with a beam detection (BD) sensor or the like, disposed in the neighborhood of a scanning commencement. When the BD sensor detects scanning light, a BD signal is delivered to notify a location where the scanning started. After the BD signal turned inable, the HSZ signal turns inable with a time lag equivalent to the LM, and then the image data are transmitted. Thus the left side margin called LM is secured on paper.

After the scanning is started, the virtual data pixels are inserted in the SPAN, . . . , SPANn sequentially one after another until scanning of line 1 is completed. The line 1 is thus generated, and the line 2 and the lines afterwards are generated in the same manner.

Figure 6:
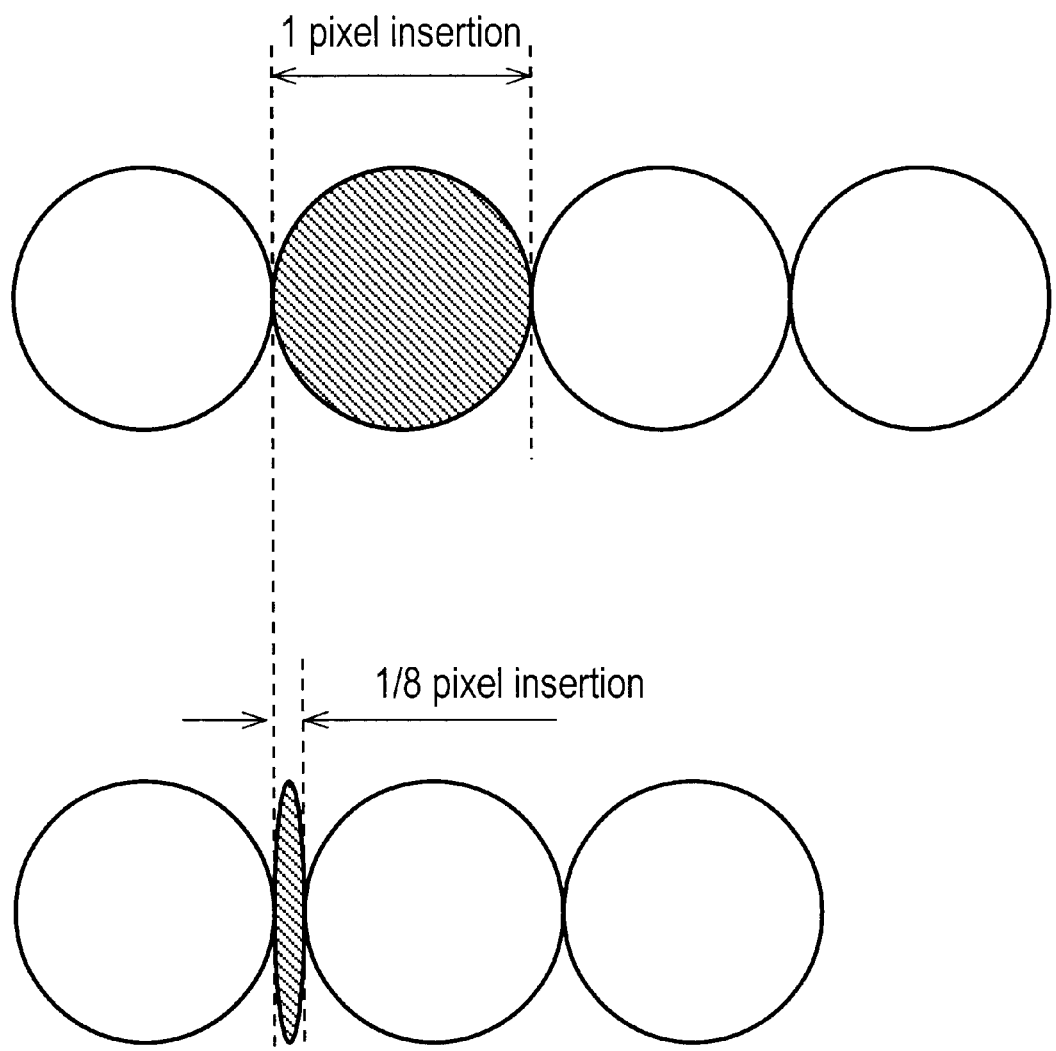
FIG. 6 is an example of print image by an image processing apparatus in a first through a sixth exemplary embodiments, with the size of inserted pixel varied.

Although in the present embodiment the CLK0 has been made as 1-pixel basic clock, while the CLK1 as 8-pixel clock, the CLK0 may be determined instead as ⅛ pixel basic clock, while the CLK1 as 1-pixel clock. By so doing, the image processing can be conducted at a unit smaller than one pixel, as shown in FIG. 6.

Under the above-described configuration, the respective places for inserting virtual data pixel are determined with a certain small pixel unit, which means that the image conversion processing is conducted at the level of pixel unit. In this way, disjunction among a plurality of image data in the main scanning magnification index can be avoided with a high precision level, yet at an inexpensive cost involved.

Embodiment 2

Figure 7:
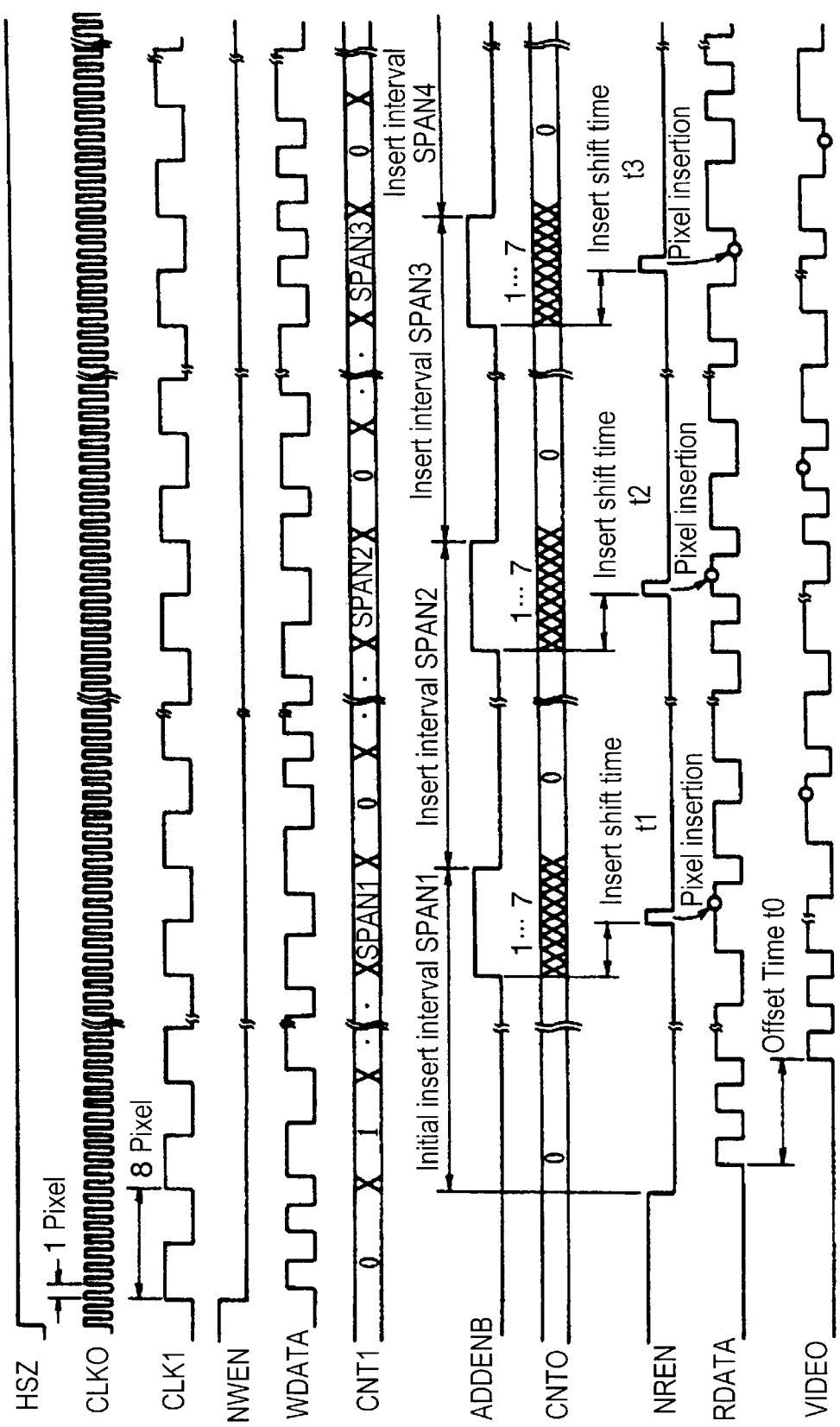
FIG. 7 is a timing chart of an image processing apparatus in a second, a fourth, a fifth and a sixth exemplary embodiments.

FIG. 7 is a timing chart of an image processing apparatus in a second exemplary embodiment of the present invention. The device structure, the circuit structure, the status transition and the printing example with respect to the present embodiment remain the same as those shown in FIG. 1, FIG. 2, FIG. 4 and FIG. 5, respectively.

In FIG. 7, when the HSZ signal is effectuated, the memory write sequencer 15 turns the write control signal NWEN inable, and starts storing the serial image data WDATA into FIFO 16.

When the write control signal NWEN is inabled, the FIFO 16 stores the serial image data WDATA sequentially one after another into memory cell at the rising edge of CLK0.

When the image data WDATA are cached in the FIFO 16, the memory read sequencer 17 turns the read control signal NREN inable, and starts reading the image data RDATA.

When the read control signal NREN is turned inable, the memory read sequencer 17 outputs image data RDATA sequentially one after another out of the memory cell of FIFO 16 at the rising edge of CLK0. At the same time, the span controller 19 inables the counter CNT1, and starts counting time with the CLK1 as reference. As soon as it reaches the initial insert interval SPAN1, a pixel insertion flag signal ADDENB is delivered, and the CNT1 is initialized to resume the counting.

In the present embodiment, the span controller 19 is provided with a counter CNT0 for counting an insertion shift time, in addition to the counter CNT1. During the ADDENB is in the inable state, the counter CNT0 starts counting time with the CLK0 as the reference. As soon as it reaches insertion shift time t1, the memory read sequencer 17 disables the read control signal NREN at the rising edge of CLK0, suspends the reading of image data RDATA out of FIFO 16, and inserts virtual pixel data in the image pixel data. The adding of pixel data is performed, like in embodiment 1, by inserting an appropriate pixel relative to the value of neighboring pixels. The insertion of n pixels is performed in the same manner from the insertion shift time t2 until it reaches tn.

The values to be used in each of the insert intervals SPAN1–SPANn, inserting pixel counts n, and shift times t1–tn are set in advance at the register 20 by a CPU. The insert intervals SPAN2–SPANn are identical to each other, and the same applies to the insert shift times t1–tn.

The SPAN1 is shorter than other insert intervals SPAN2–SPANn by CNT1 count 1. This is because the span controller 19 uses value 0 for the initial value of counter CNT1. The insert intervals SPAN1–SPANn can be made equal by setting the initial value of counter CNT1 at −1.

Video output connector 21 transmits the video signal VIDEO to an external image generator for printing.

Although the counter for calculating the inserting location has been separated into CNT1 and CNT0, these may be integrated into one unit. Although the CNT0 is set to count the insertion shift time when the ADDENB is in inable state, the CNT0 may be set to be always active for generally counting the insertion shift time.

As shown in FIG. 5, when scanning is started in an image processing apparatus of the present embodiment, the virtual data pixel is inserted consecutively one after another shifting the insertion shift time from t1–tn until scanning of line 1 is completed. Line 2 and the lines afterwards are generated in the same manner.

Under the above-described configuration, respective places for inserting virtual data pixels are determined with a unit of a small pixel, which means that the image conversion processing is conducted at a fine level of very small pixel. In this way, disjunction among a plurality of image data in the main scanning magnification index can be avoided with a high precision level, yet at an inexpensive cost involved.

Embodiment 3

Figure 8:
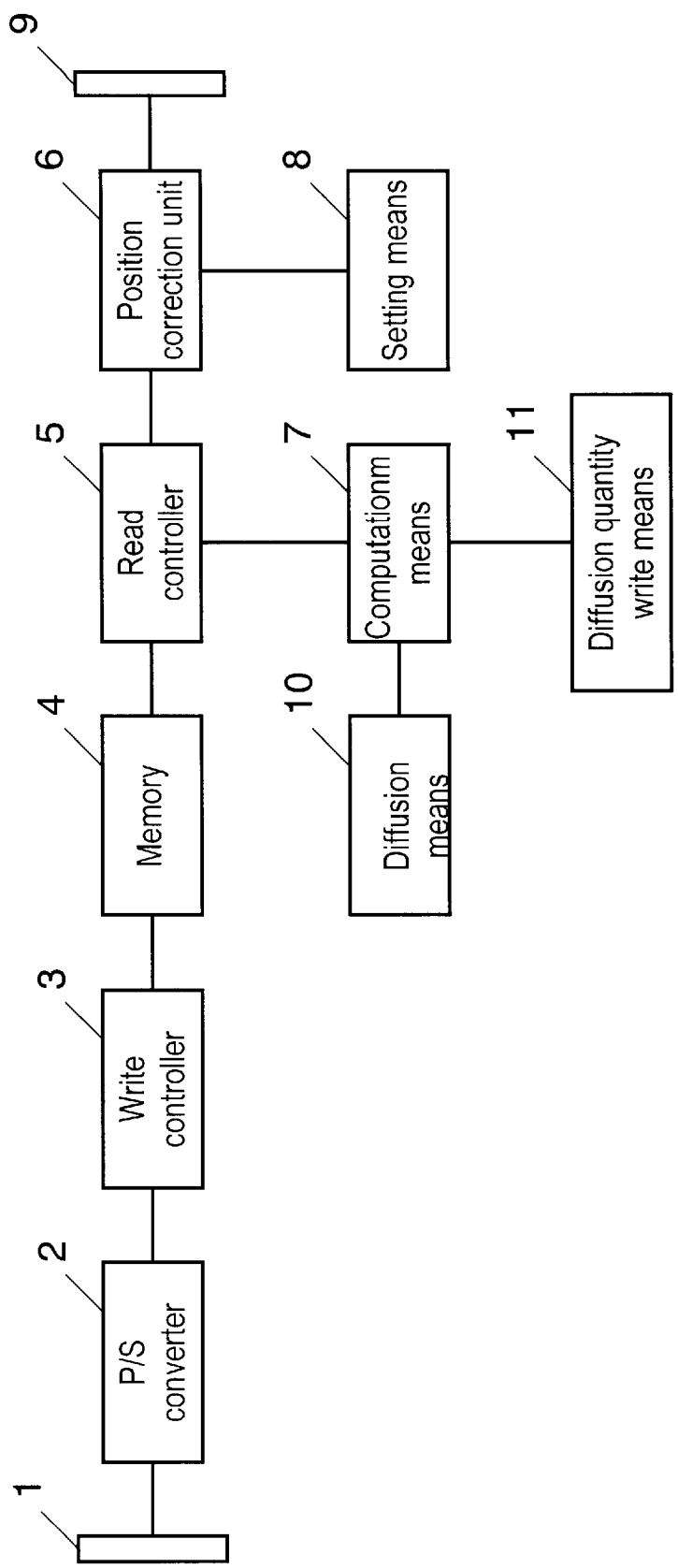
FIG. 8 is a block diagram showing a device structure of an image processing apparatus in a third, a fourth and a sixth exemplary embodiments.
Figure 9:
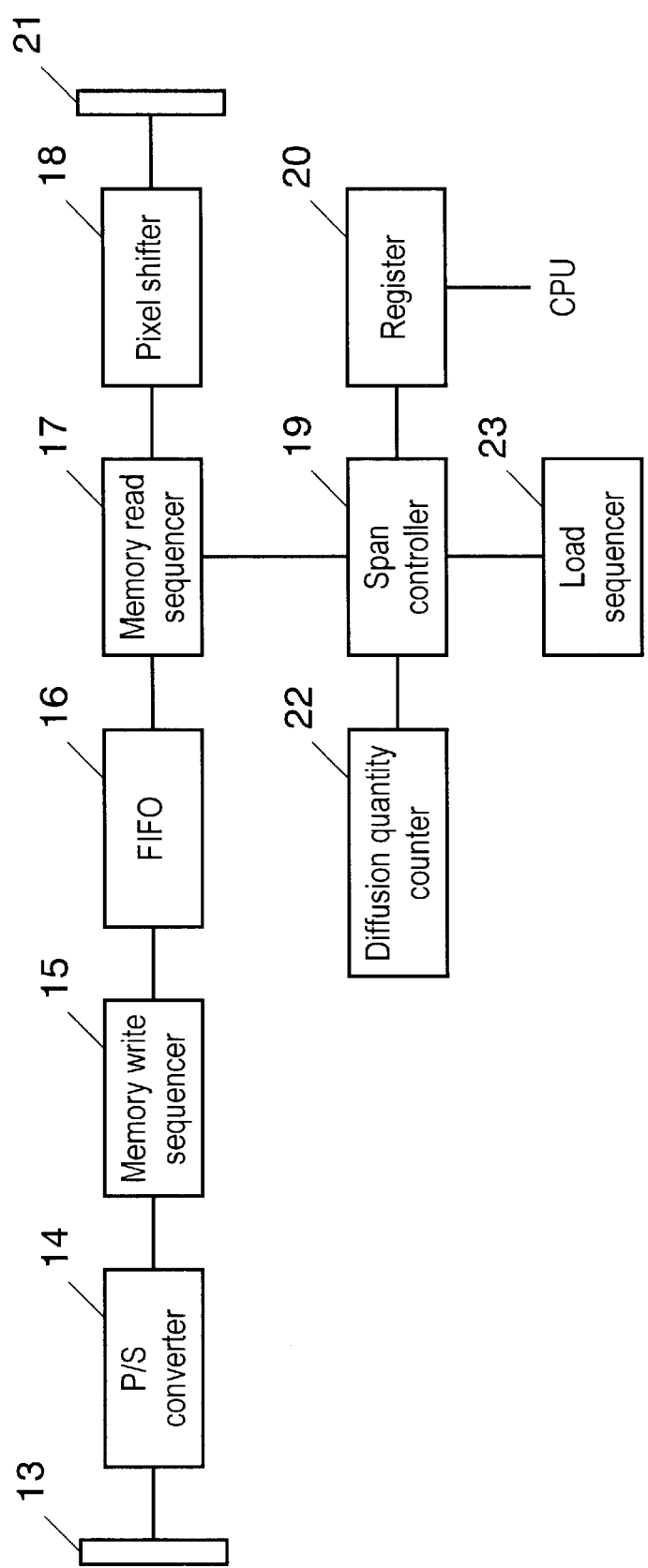
FIG. 9 is a block diagram showing a circuit structure of an image processing apparatus in a third, a fourth and a sixth exemplary embodiments.
Figure 10:
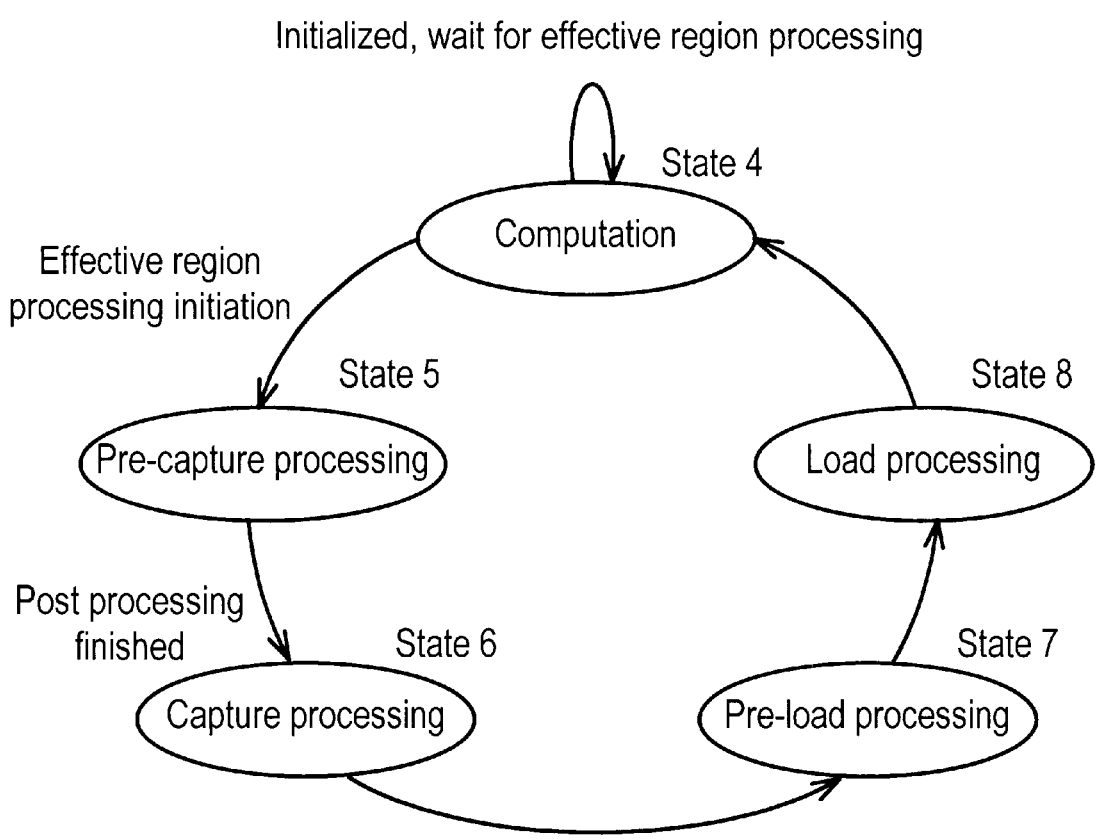
FIG. 10 is a status transition chart of an image processing apparatus in a third, a fourth and a fifth exemplary embodiments.
Figure 11:
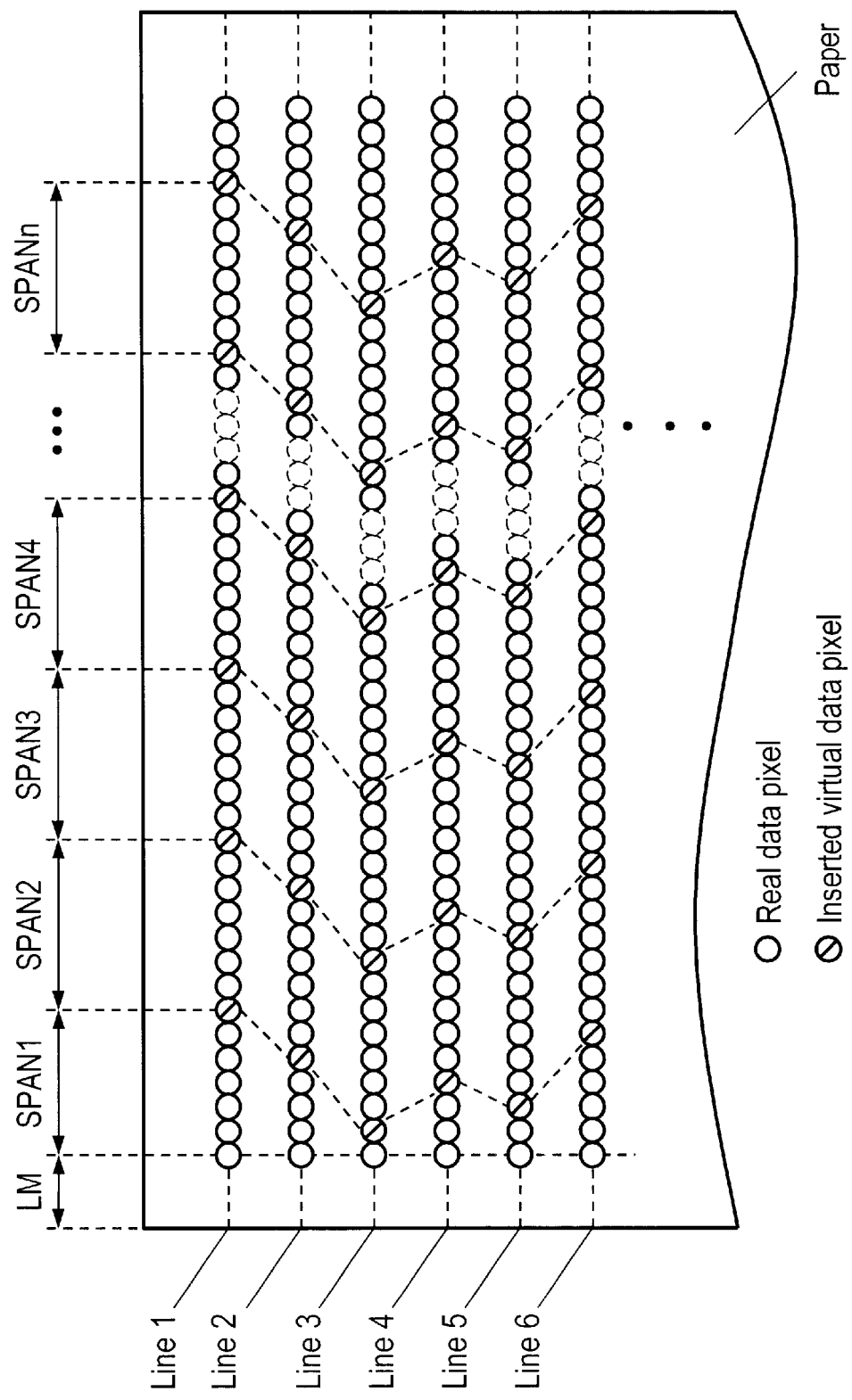
FIG. 11 is an example of print image by an image processing apparatus in a third and a fourth embodiments.

FIG. 8 is a block diagram showing the structure of an image processing apparatus in a third exemplary embodiment of the present invention. FIG. 9 is a block diagram showing the circuit structure of the image processing apparatus of FIG. 8. FIG. 10 shows a status transition in the image processing apparatus of FIG. 8. FIG. 11 is an example of printing by the image processing apparatus of FIG. 8. The timing chart and the status transition being controlled by one read controller remain the same as those shown respectively in FIG. 3 and FIG. 4, which were referred to in embodiment 1.

An image processing apparatus of the present embodiment shown in FIG. 8 is provided further, as compared with that of embodiment 1, with diffusion means 10 for calculating diffusion quantity based on information set at the setting means 8, and diffusion quantity write means 11 for writing a diffusion quantity calculated by the diffusion means 10 into the computation means 7.

In FIG. 9, a diffusion quantity counter 22 is for the diffusion means 10 of FIG. 8, which diffusion counter 22 is an s-digit counter that repeats additions up to an insert interval s set in advance at the register 20 by a CPU. A load sequencer 23 is for the diffusion quantity write means 11, and load sequencer 23 is a control circuit for writing a diffusion quantity calculated by the diffusion quantity counter 22 into a span controller 19.

An image processing apparatus in the present embodiment comprises a plurality of circuits of FIG. 9 provided for respective colors. Therefore, it is capable of processing a plurality of image data, e. g. C.M.Y.K, independently to each other.

As already described earlier, the status transition under the control of a memory read sequencer 17, among others, remains the same as that described in embodiment 1 referring to FIG. 4.

Here, an exemplary status transition controlled by a diffusion quantity write means 11 (load sequencer 23), among others, is shown in FIG. 10. The present image processing apparatus handles a plurality of image data in respective colors, and the control on the status transitions are taken place in pluralities, each being totally independent to each other.

In the status transition shown in FIG. 10, which is under the control of the load sequencer 23, state 4 represents a state of computation under way. While the HSZ signal stays ineffective after the finish of initialization, the present image processing apparatus keeps stand-by posture in this state. The diffusion means 10 (diffusion quantity counter 22) repeats adding operations until it reaches insert interval s set at the register 20 in advance by a CPU. As soon as the HSZ signal turns effective and the memory write sequencer 15 starts caching of data into FIFO 16, the present image processing apparatus transits to a next state 5.

The state 5 represents a state of pre-capture processing. By watching the status transition of FIG. 4, the present image processing apparatus detects that the entire processing, viz. the storage, the read-out and the insertion, is now over with respect to each of the respective scanning. As soon as the post processing of FIG. 4 is finished, it transits to a next state 6.

The state 6 represents a state of capture processing. The computation process is once suspended for initializing the span controller 19. After a certain specific time in this state, it transits to a next state 7.

The state 7 represents a state of pre-load processing. The present image processing apparatus keeps the diffusion quantity at the diffusion means 10 (diffusion quantity counter 22). Specifically, in a case where the diffusion means 10 (diffusion quantity counter 22) and the computation means 7 (span controller 19) are driven simultaneously under separate clock sources, it is possible to once suspend the calculating operation. After a certain specific time in this state, it transits to a next state 8.

The state 8 represents a state of load processing. The diffusion quantity write means 11 (load sequencer 23) inables the load signal LOAD to approve writing a current diffusion quantity calculated by the diffusion means (diffusion quantity counter 22) into the computation means 7 (span controller 19). After a certain specific time, the present image processing apparatus releases, depending on needs, the suspension set on the computation means 7 (span controller 19) and the diffusion means 10 (diffusion quantity counter 22), and transits to the earlier-described state 4.

Operation of an image processing apparatus in the present embodiment is that, as shown in FIG. 3, the memory write sequencer 15 starts, when the HSZ signal becomes effective, storing the serial image data WDATA into the FIFO 16, and stores them into the memory cell sequentially one after another. When the image data WDATA are cached, the memory read sequencer 17 outputs image data RDATA out of the memory cell sequentially one after another. At the same time, the span controller 19 inables the counter CNT1, and conducts the pixel insertion process after the initial insert interval SPAN1 elapsed. The span controller 19 continues the pixel insertion process for the SPAN2, SPAN3, SPAN4, . . . , up to the SPANn, for n pieces. The insert intervals SPAN1–SPANn are identical to each other. The video signal VIDEO is ultimately transmitted via the video output connector 21 to an external image generator for printing.

When scanning is finished with line 1, and transited to a load state, the load sequencer 23 inables the load signal LOAD, and sets a diffusion quantity calculated by the diffusion quantity counter 22 in the span controller 19 as the initial insert value SPAN1. The initial insert value SPAN1 is used for the image processing at the scanning of the next line 2.

Next, an example of printing by an image processing apparatus in the present embodiment is described with reference to FIG. 11.

In FIG. 11, once the scanning is started, the virtual data pixels are inserted in the SPAN1, . . . , SPANn sequentially one after another to complete the scanning of line 1. After the line 1 is thus processed, a diffusion quantity X1 is set as the value of SPANI for line 2, and scanning of line 2 starts. The CNT1 starts counting from the diffusion quantity X1. This provides an initial insert interval SPAN1 that is different from that of line 1. Each of the SPAN2, . . . , SPANn is identical to that of line 1.

After the line 2 is processed in the same way, a diffusion quantity X2 is set as the value of SPAN1 for line 3, and the line 3 is formed. Repetition of the same procedure provides an image shown in FIG. 11, in which the pixels are inserted irregularly. Processing on each line follows in the same way.

Under the above-described configuration, respective places for inserting virtual data pixel are determined with a certain unit of small pixel, which means that the image conversion processing is conducted at a fine level with the unit of a small pixel. In this way, disjunction among a plurality of image data in the main scanning magnification index can be avoided with a high precision level, yet at an inexpensive cost involved.

Embodiment 4

FIG. 11 shows an example of printing by an image processing apparatus in a fourth exemplary embodiment of the present invention. The apparatus structure, the circuit structure, the timing chart and the status transition in the present embodiment remain the same as those shown in FIG. 4, FIG. 7, FIG. 8, FIG. 9 and FIG. 10.

In FIG. 7, the memory write sequencer 15 starts, when the HSZ signal is effectuated, storing serial image data WDATA in FIFO 16, and stores them into the memory cell sequentially one after the other.

After they are cached in, the memory read sequencer 17 outputs the image data RDATA out of the memory cell sequentially one after another. At the same time, the span controller 19 inables the counter CNT1. After the initial insert interval SPAN1 elapsed, the counter CNT0 counts insertion shift time t1, and the memory read sequencer 17 inserts data pixel. Thenceforth, the span controller 19 conducts the pixel inserting procedure shifting the insertion shift time from t2 up to tn at each insert interval, for n pieces. The insert intervals SPAN2–SPANn are the same, so are the insertion shift times t1–tn.

Video output connector 21 transmits the video signal VIDEO to an external image generator for printing.

Although a counter for calculating the inserting position has been separated into CNT1 and CNT0 in the present embodiment, these may be integrated into one unit. Although the CNT0 is set to count the insertion shift time when the ADDENB is in inable state, the CNT0 may be set instead to be always active for generally counting the insertion shift time.

When scanning is finished for one line and transited to a load state, the load sequencer 23 inables the load signal LOAD, and sets a diffusion quantity calculated at the diffusion quantity counter 22 in the span controller 19 as the initial insert value SPAN1 of CNT1 and insertion shift time t1. The initial insert value SPAN1 and the insertion shift time t1 are used for the image processing at the next scanning.

Next, a practical exemplary printing by an image processing apparatus in the present embodiment is described with reference to FIG. 11. In FIG. 11, the white circles represent real data pixels, while the circles having oblique line represent inserted virtual data pixels.

When the scanning is started, the virtual data pixels are inserted consecutively shifting the insertion shift time from t1–tn until scanning of line 1 is completed. After the processing on line 1 is finished, an upper order diffusion quantity data X1 is set as the SPAN1 value, and a lower order diffusion quantity data Y1 is set as the reference value for t1, in preparation for scanning of line 2.

When the line 2 scanning starts, the CNT1 starts counting based on the diffusion quantity X1. This provides an initial insert interval SPAN1 that is different from that of the line 1. When the ADDENB signal turns inable, the counter CNT0 starts counting, and the insertion shift time t1 reaches the diffusion quantity Y1, then the data pixel is inserted.

After the processing on line 2 is finished in the same way, an upper order diffusion quantity data X2 is set as the SPAN1 value, and a lower order diffusion quantity data Y2 is set as the reference value for t1, in preparation for scanning of line 3. Eventually, an image as shown in FIG. 11 is generated.

Under the above-described configuration, respective places for inserting virtual data pixel are determined with a certain unit of small pixel, which means that the image conversion processing is performed at a fine level with the unit of very small pixel. In this way, disjunction among a plurality of image data in the main scanning magnification index can be avoided with a high precision level, yet at an inexpensive cost involved.

Embodiment 5

Figure 12:
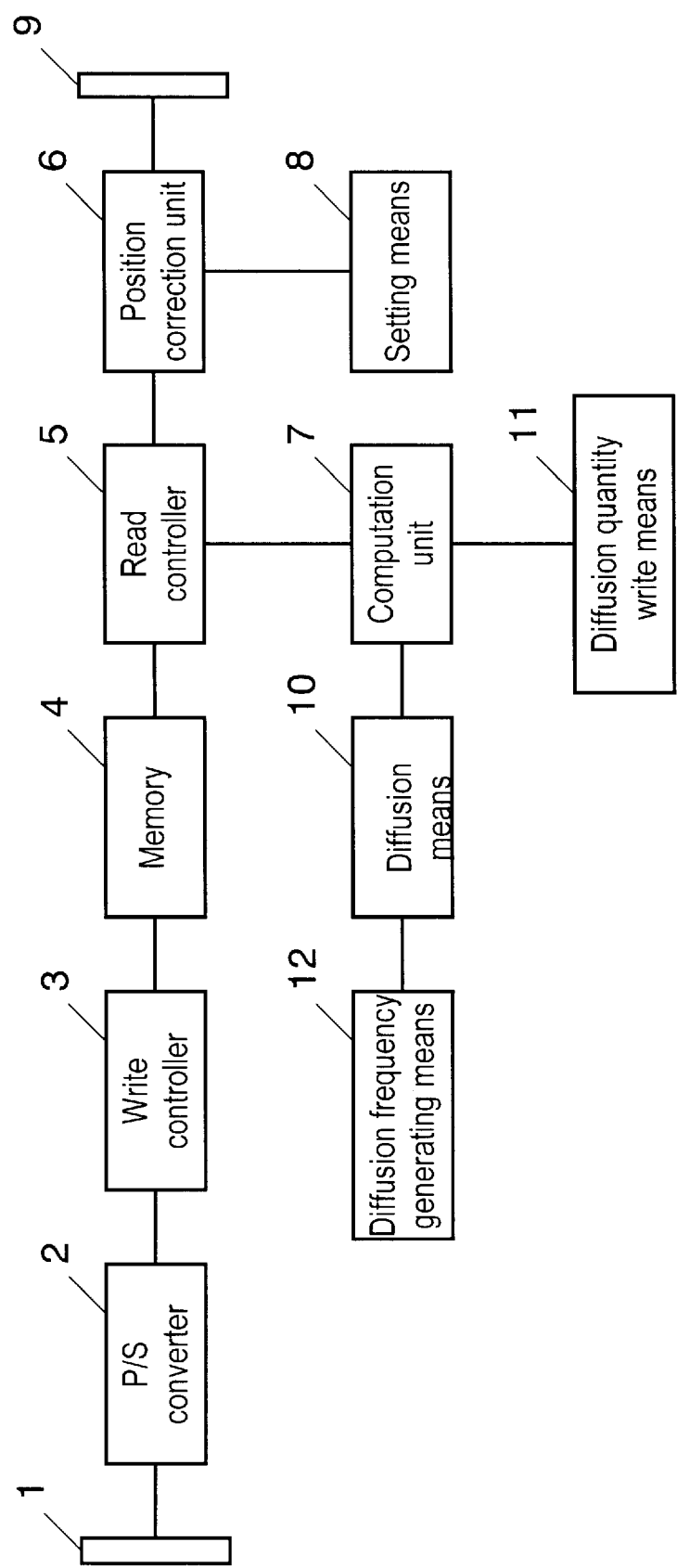
FIG. 12 is a block diagram showing a device structure of an image processing apparatus in a fifth exemplary embodiment.
Figure 13:
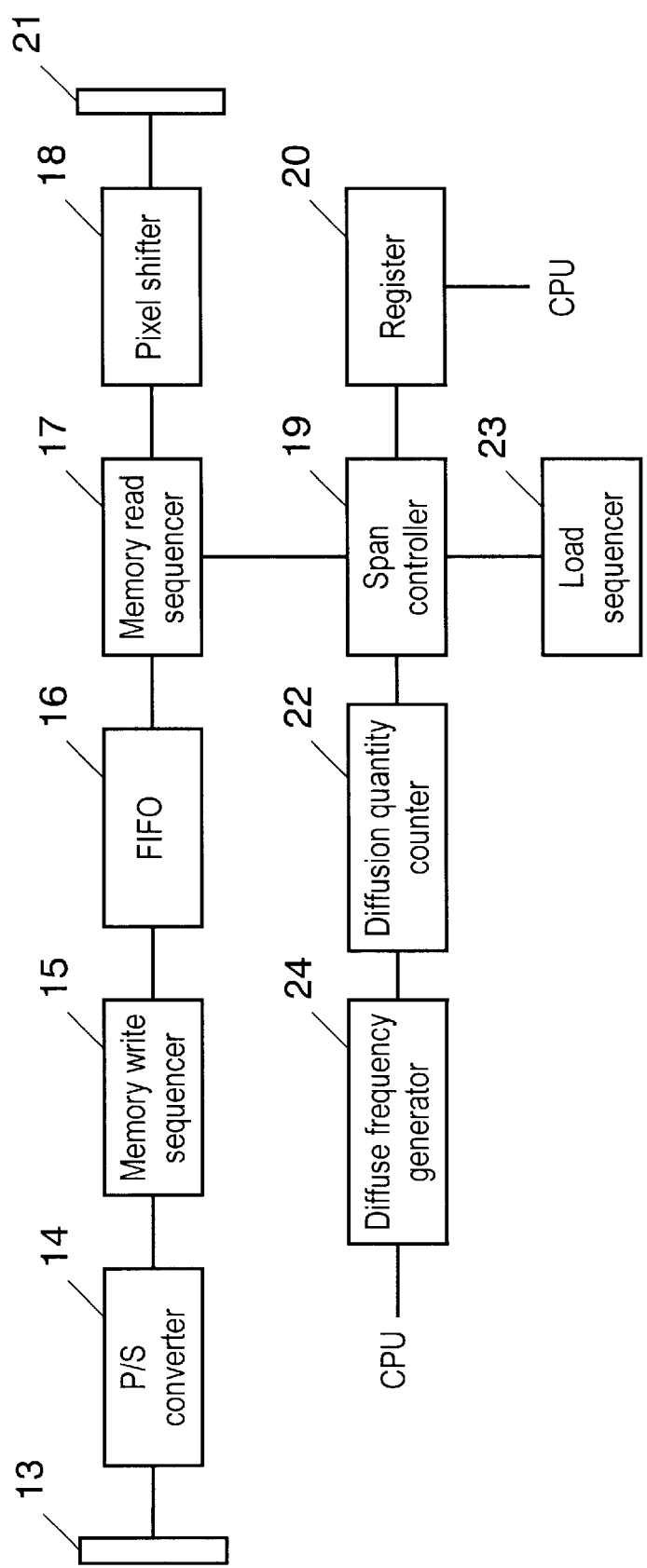
FIG. 13 is a block diagram showing a circuit structure of an image processing apparatus in a fifth exemplary embodiment.

FIG. 12 is a block diagram showing the device structure of an image processing apparatus in a fifth exemplary embodiment of the present invention. FIG. 13 is a block diagram showing the circuit structure of the image processing apparatus of FIG. 12. The status transition in the present image processing apparatus remains the same as those described earlier referring to FIG. 4 and FIG. 10. The timing chart is the same as FIG. 7, and the exemplary printing chart is the same as FIG. 11.

The image processing apparatus in the present embodiment shown in FIG. 12 is provided further, as compared with that in embodiment 3, with diffusion frequency generating means 12 for generating diffusion frequency that is controllable by a CPU.

In FIG. 13, a diffusion frequency generator 24 is for the diffusion frequency generating means 12 of FIG. 12. The diffusion frequency generator 24 is an f-digit counter that repeats additions up to a diffusion frequency f that can be set by a CPU.

An image processing apparatus in the present embodiment comprises a plurality of circuits of FIG. 13 provided for respective colors. Therefore, it is capable of processing a plurality of image data, e. g. C.M.Y.K, independently to each other.

In FIG. 7, as soon as it reaches the initial insert interval SPAN1, the memory read sequencer 17 conducts the pixel insertion at the insertion shift time t1. Thenceforth, the pixel inserting procedure is conducted shifting the insertion shift time from t2 up to tn at each insert interval, for n pieces. The insert intervals SPAN2–SPANn are the same to each other, so are the insertion shift times t1–tn.

The diffusion frequency generator 24, which is set in advance with a certain diffusion frequency f by a CPU, repeats adding up to the f after it is set by a CPU. Upon reaching the diffusion frequency f, the diffusion frequency generator 24 generates a clear pulse CLEAR. As soon as the diffusion quantity counter 22 receives the CLEAR, it once initializes the adding up to the insert interval s set in advance at the register 20 by CPU to resume generation of the diffusion quantity, except when it is in a pre-load processing state, or in a load state.

When one scanning is finished and transited to a load state, the load sequencer 23 inables the load signal LOAD, and sets a diffusion quantity calculated at the diffusion quantity counter 22 in the span controller 19 as the initial insert value SPAN1 of CNT1 and the initial insertion shift time t1. The initial insert value SPAN1 and the initial insertion shift time t1 are used for the image processing at the next scanning.

When the diffusion quantity counter 22 is thus initialized, asynchronously to the diffusion cycle n, at every 1/f diffusion cycle set in advance by a CPU, it functions as an external disturbance. By so doing, a diffusion quantity having a higher complication level can be generated.

Video output connector 21 transmits the video signal VIDEO to an external image generator for printing.

Although the counter for calculating the inserting position in the present embodiment has been separated into CNT1 and CNT0, these may be integrated into one unit. Although the CNT0 is set to count the insertion shift time when the ADDENB is in inable state, the CNT0 may be set instead to be always active for generally counting the insertion shift time.

As illustrated in FIG. 11, when the scanning is started, in the image conversion processing, the virtual data pixel is inserted consecutively shifting the insertion shift time from t1–tn until scanning of line 1 is completed. After the processing on line 1 is finished, respective diffusion quantities X1, Y1 are set, and the scanning on and after line 2 is conducted to ultimately generate an image shown in FIG. 11. During the above procedure, the CLEAR is generated at every 1/f diffusion cycle, and the initial quantities of respective diffusions create a variation of higher irregularity.

Under the above-described configuration, respective places for inserting virtual data pixel are determined with a certain unit of small pixel, which means that the image conversion processing is performed at a fine level with the unit of small pixel. In this way, disjunction among a plurality of image data in the main scanning magnification index can be avoided with a high precision level, yet at an inexpensive cost involved.

Embodiment 6

Figure 14:
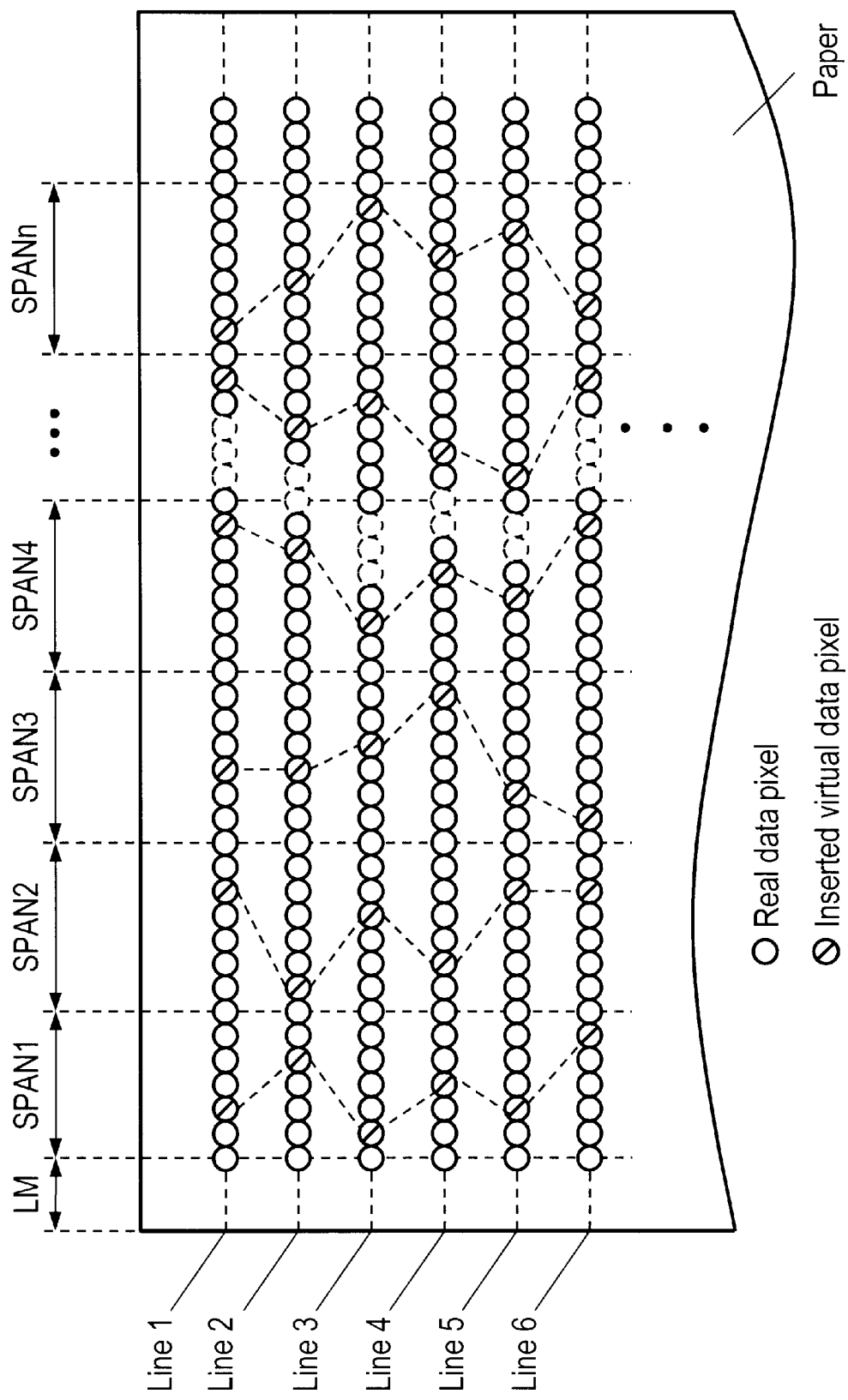
FIG. 14 is an example of print image by an image processing apparatus in a sixth exemplary embodiment.

FIG. 14 is an example of printing by the image processing apparatus of FIG. 12. The device block diagram and the circuit block diagram in the present exemplary embodiment are the same as FIG. 8 and FIG. 9 referred to earlier in embodiment 3. The status transition remains the same as that described with reference to FIG. 4. The timing chart is the same as FIG. 7 described earlier.

In FIG. 9, a diffusion quantity counter 22, which is an implementation for the diffusion means 10 of FIG. 8, is a circuit which generates random numbers. As soon as initialization is finished after power ON, it generates random numbers continuously until the insert interval s set in advance at the register 20 by CPU is reached. The diffusion quantity counter 22 is provided with a built-in register for storing a calculated value. The built-in register holds the value, after a certain specific short time is elapsed, as an initial value R0.

In FIG. 7, when the HSZ signal is effectuated, the memory write sequencer 15 starts storing the serial image data WDATA into the FIFO 16, and into the memory cell sequentially one after another.

After the caching, the memory read sequencer 17 inables the read control signal NREN, and starts reading image data RDATA. When the read control signal NREN turned inable, the FIFO 16 outputs image data RDATA sequentially one after another out of the memory cell at the rising edge of CLK0. At the same time, the span controller 19 inables the counter CNT1, and starts counting time with the CLK1 as the reference. At the time when the CNT1 value coincided with upper order data of the initial value R0 of the random numbers generated at the diffusion quantity counter 22 , the pixel insertion flag signal ADDENB is delivered with the CLK1 as the reference, and the CNT1 is initialized to resume the counting.

During the ADDENB is in inable state, the CNT0 starts counting time with the CLK0 as the reference. Upon reaching at a time t1, when the CNT0 value coincided with lower order data of the initial value R0 of the random numbers generated at the diffusion quantity counter 22, the memory read sequencer 17 disables the read control signal NREN at the rising edge of CLK0, suspends the reading of image data RDATA from FIF0 16, and adds the virtual data pixel. The insertion is made with an appropriate pixel relative to the value of neighboring pixels.

When the ADDENB is disabled, the span controller 19 makes the built-in register of diffusion quantity counter 22 once hold a value of the generated random numbers, in preparation for the next processing at SPAN 1.

In the same way, the memory read sequencer 17 conducts the insertion of n pixels, shifting the insertion shift time from t1, . . . , up to tn.

Video output connector 21 transmits the video signal VIDEO to an external image generator for printing.

Although the counter for calculating the inserting position has been separated into CNT1 and CNT0, these may be integrated into one unit. Although the CNT0 is set to count the insertion shift time when the ADDENB is in inable state, the CNT0 may be set instead to be always active for generally counting the insertion shift time.

In FIG. 14, the white circles represent real data pixels, while the circles having oblique line represent inserted virtual data pixels.

When the scanning is started, the virtual data pixels are inserted shifting the insertion shift time from t1, . . . , tn until scanning of line 1 is completed. The line 2 and afterwards are generated in the same manner. Each of the insert intervals SPAN, . . . , SPANn, and each of the insertion shift times t1–tn are formed respectively as different intervals to each other in each of the respective lines.

Under the above-described configuration, respective places for inserting virtual data pixel are determined with a certain unit of small pixel, which means that the image conversion processing is performed at a fine level with the unit of small pixel. In this way, disjunction among a plurality of image data in the main scanning magnification index can be avoided with a high precision level, yet at an inexpensive cost involved.

As described in the foregoing, in an image processing apparatus of the present invention, while write controller stores image data into a memory, read controller independently reads image data out of the memory and inserts data pixels at every certain specific moment computed by computation means. Therefore, disjunction among a plurality of image data in the main scanning magnification index can be avoided with a high precision level, yet at an inexpensive cost involved.

Thus an image converting process may be performed real time at an inexpensive cost.

If diffusion means and diffusion quantity write means are further provided, it can control reading of image data out of memory and time for starting the inserting procedure.

Furthermore, by generating irregular time information from the diffusion means at every certain specific timing, along with the start of reading image data out of memory, it turns out possible to control the timing for inserting data pixel at the computation means.

Still further, if diffusion means, diffusion quantity write means and diffusion frequency generating means are further provided, a more irregular time information can be made available through a control on the diffusion means by means of a diffusion frequency generated by the diffusion frequency generating means. Thus it turns out possible to control reading of image data out of the memory and time for starting the additional processing.

Although in each of the above-described embodiments the CLK0 has been described as the 1-pixel basic clock and the CLK1 as the 8-pixel clock these are only exemplary; by determining the CLK0 as the ⅛ pixel basic clock and the CLK1 as 1-pixel clock, for example, the image processing can be performed at a level finer than 1-pixel unit, as shown in FIG. 6.

The values and the methods described in the above embodiments are only examples, it is to be understood that these are not to be interpreted as limiting the scope of the present invention.

What is claimed is:

1. An image processing apparatus comprising:
   an input image data connection means connecting to an external device,
   a parallel/serial conversion means for performing the parallel serial conversion on said image data,
   a memory for storing said converted image data,
   a write control means for controlling writing of image data into said memory,
   a read control means for reading said image data out of said memory,
   a setting means for storing control information specified by an external central processing unit,
   a computation means for computing, in accordance with information set at said setting means, a timing for inserting a data pixel into said image data at every certain specific pixel unit,
   a position correction means for adjusting output timing for said image data, and
   an output image data connection means for transmitting image data added with said data pixel to a further external device.

2. The image processing apparatus of claim 1, wherein said computation means starts counting time when said read control means starts reading said image data out of said memory, upon reaching a certain specific time, said read control means suspends the reading of said image data to insert virtual data pixel into said image data.

3. The image processing apparatus of claim 1, wherein said computation means starts counting time when said read control means starts reading image data out of said memory, upon reaching a certain specific insertion shift time after it reaching a certain specific time, said read control means suspends the reading of image data out of said memory to insert virtual data pixel into said image data.

4. An image processing apparatus comprising:
   an input image data connection means connecting to an external device,
   a parallel/serial conversion means for performing the parallel serial conversion on said image data,
   a memory for storing said converted image data,
   a write control means for controlling writing of image data into said memory,
   a read control means for reading said image data out of said memory,
   a setting means for storing control information specified by an external central processing unit,
   a computation means for computing, in accordance with information set at said setting means, a timing for inserting data pixel in said image data at every certain specific pixel unit, a position correction means for adjusting output timing for said image data, a output image data connection means for transmitting said image data added with said data pixel to a further external device, a diffusion means for calculating diffusion quantity based on the information set at said setting means, and a diffusion quantity write means for writing said diffusion quantity calculated by said diffusion means in said computation means.

5. The image processing apparatus of claim 4, wherein said computation means starts counting time in the first scanning line when said read control means starts reading image data out of said memory, upon reaching a certain specific insertion time said read control means suspends reading of image data out of said memory to insert virtual data pixel in said image data, and in each of the subsequent scanning lines said diffusion quantity write means sets a diffusion quantity, which being different for each of the lines, calculated by said diffusion means as the initial insert interval of the relevant line to make subsequent insert intervals equal.

6. The image processing apparatus of claim 4, wherein said computation means starts counting time in the first scanning line when said read control means starts reading image data out of said memory, upon reaching a certain specific insertion shift time after a certain specific insert interval, said read control means suspends reading of image data out of said memory to insert virtual data pixel in said image data, and in the subsequent scanning lines, said diffusion quantity write means sets a diffusion quantity, which being different for each of the lines, calculated by said diffusion means as the initial insert interval of the relevant line to make the subsequent insert intervals equal.

7. The image processing apparatus of claim 4, wherein said diffusion means generates random numbers, said computation means starts counting time with a first counter when said read control means starts reading of image data out of said memory, as soon as the count value coincides with upper order data of the initial value of random numbers generated by said diffusion means a second counter starts counting time, as soon as it coincides with lower order data of the initial value of said random numbers said read control means suspends reading of image data out of said memory to insert virtual data pixel in said image data.

8. An image processing apparatus comprising an input image data connection means connecting to an external device, a parallel/serial conversion means for performing the parallel serial conversion on said image data, a memory for storing said converted image data, a write control means for controlling writing of image data into said memory, a read control means for reading said image data out of said memory, a setting means for storing control information specified by an external central processing unit, a computation means for computing, in accordance with information set at said setting means, a timing for inserting data pixel in said image data at every certain specific pixel unit, a position correction means for adjusting output timing for said image data, an output image data connection means for transmitting image data added with said data pixel to a further external device, a diffusion means for calculating diffusion quantity based on the information set at said setting means, a diffusion quantity write means for writing said diffusion quantity calculated by said diffusion means in said computation means, and a diffusion frequency generating means for generating diffusion frequency that is controllable by an external central processing unit.

9. The image processing apparatus of claim 8, wherein said diffusion frequency generating means initializes at each specific cycle the value calculated by said diffusion means, said computation means starts counting time in the first scanning line when said read control means starts reading of image data out of said memory, upon reaching a certain specific insertion shift time after a certain specific insert time said read control means suspends reading of image data out of said memory to insert virtual data pixel in said image data, and in the subsequent scanning lines said diffusion quantity write means sets a diffusion quantity, which being different for each of the lines, calculated by said diffusion means in said computation means as the initial insert interval and the initial insertion shift time to make the subsequent insert intervals and the insertion shift times, respectively, equal.

* * * * *